United States Patent
Cresswell et al.

(10) Patent No.: US 8,683,930 B2
(45) Date of Patent: Apr. 1, 2014

(54) SIDE MOUNTED AIR SEEDER PRODUCT CONTAINER

(75) Inventors: Mark Cresswell, St. Brieux (CA); Brad Geoffrey Hicks, St. Brieux (CA)

(73) Assignee: Bourgault Industries Ltd., St. Brieux, Saskatchewan (CA)

( * ) Notice: Subject to any disclaimer, the term of this patent is extended or adjusted under 35 U.S.C. 154(b) by 278 days.

(21) Appl. No.: 13/277,470

(22) Filed: Oct. 20, 2011

(65) Prior Publication Data

US 2013/0101384 A1    Apr. 25, 2013

(51) Int. Cl.
*A01C 7/00* (2006.01)
*A01C 9/00* (2006.01)

(52) U.S. Cl.
USPC ........... 111/174; 111/177; 111/173; 111/200; 111/925

(58) Field of Classification Search
USPC .......................... 111/170, 177–188, 200, 925
See application file for complete search history.

(56) References Cited

U.S. PATENT DOCUMENTS

| | | | |
|---|---|---|---|
| 7,523,710 B2 | 4/2009 | Wilson | |
| 7,765,944 B2 | 8/2010 | Wilson | |
| 2005/0235890 A1* | 10/2005 | Mariman et al. | 111/174 |
| 2011/0167712 A1* | 7/2011 | Brasil | 44/307 |

* cited by examiner

*Primary Examiner* — Christopher J Novosad
(74) *Attorney, Agent, or Firm* — Frost Brown Todd LLC

(57) ABSTRACT

An air seeder cart apparatus has a primary container assembly with a plurality of primary product containers, with primary fill hatches at tops thereof. An air distribution network comprises product conduits and primary metering devices that dispense agricultural products from each primary product container into one of the product conduits. A secondary product container is mounted on a side of the primary container assembly and has a secondary fill hatch much lower than the primary fill hatches, and a secondary metering mechanism dispenses product from the secondary product container into one of the product conduits. The secondary product container is convenient for receiving bagged agricultural products from a low truck bed. Unopened product bags may be stored on a grate inside the secondary product container so they will be available if required. Weighing of product in the container can be provided.

24 Claims, 3 Drawing Sheets

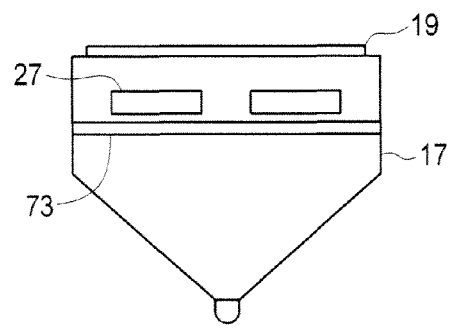
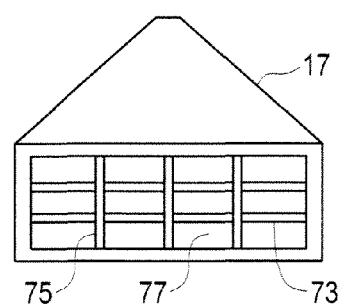
FIG. 7    FIG. 8
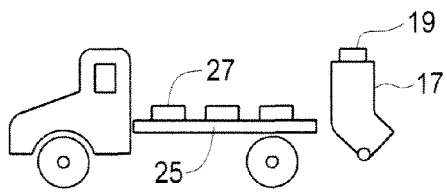
FIG. 9
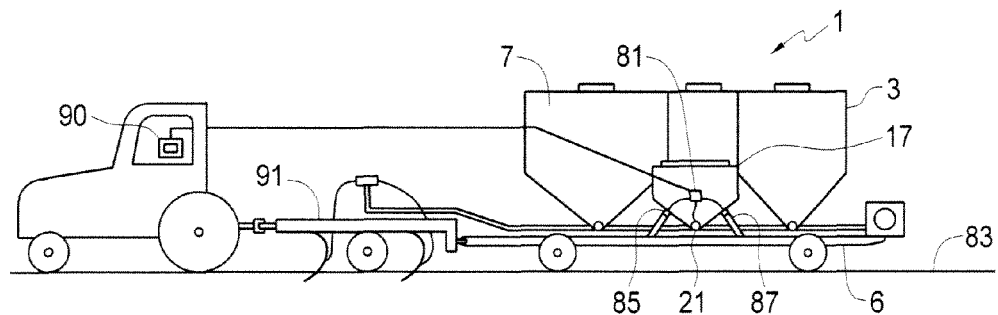
FIG. 10
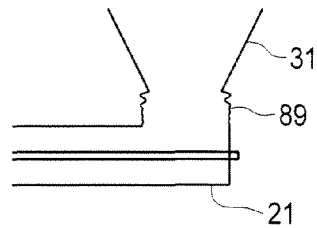
FIG. 11

SIDE MOUNTED AIR SEEDER PRODUCT CONTAINER

This invention is in the field of agricultural air seeders and in particular a container for carrying agricultural products, such as in particular small seeds or like products with low application rates.

BACKGROUND

Air seeders for seeding agricultural crops commonly include furrow openers mounted on a wheel supported implement frame for injecting agricultural products into the soil, and a cart with a number of separate containers or compartments for carrying the different agricultural products such as fertilizers, seeds, chemicals, and the like that are to be applied to the soil. A distribution network is operative to convey agricultural products from the various containers to the desired furrow opener locations.

The cart can be towed behind the implement frame or in front of the frame between the towing tractor and the frame. Where the cart is behind the frame, often a trailer carrying liquid fertilizer is towed behind the cart.

The different agricultural products are applied to a field at rates that can vary from a few pounds per acre to a few hundred pounds per acre, and so the containers are typically provided in different sizes. A typical air seeder cart will have three to five containers, with capacities ranging from several hundred cubic feet down to 50 or 60 cubic feet. Typically the containers are provided by a large tank divided into compartments, with fill hatches at the top of each compartment, and hoppered floors sloping down to a metering device at the bottom of each compartment.

When seeding canola for example, urea nitrogen fertilizer may be applied at 200 pounds per acre, sulphur fertilizer at 100 pounds per acre, phosphate fertilizer at 50 pounds per acre, and canola seed at four pounds per acre. Thus to seed 100 acres requires 20,000 pounds of urea fertilizer, 10,000 pounds of sulfur fertilizer, 5000 pounds of phosphate fertilizer, and only 400 pounds of canola seed. The different products then are placed into the different containers on the air seeder cart such that the highest use product goes into the largest container, the next highest use into the second largest, container, and so forth.

These fertilizers are generally transported in bulk form, and are moved into the hatches at the top of the compartments by a conveyor. Because of the relatively low quantity required and the relatively high value, canola seed is most commonly transported in bags which are carried to the seeder on a truck bed and manually opened and emptied into the seed compartment of the air seeder cart. These bags of canola and like agricultural products typically weigh about 50 pounds.

For this reason, and because canola is a common crop and prevalent in certain farming areas, some air seeder manufacturers provide a small container at the rear of the air seeder cart with a relatively low fill opening so that a truck can be backed up to the small container and the bags conveniently emptied into the container without climbing to an elevated hatch. The rear location is aligned with the conduits carrying the air stream and so allows the canola to be metered downward out of the container and into the air stream conduit extending under the container.

Seeding operations for other crops may also conveniently include an agricultural product with a low application rate that could conveniently be carried in the small low compartment. A problem with present low slung air seeder cart containers is that access to the location at the rear of the cart is hampered when the air seeder cart is towed between the tractor and the implement frame, and also in a tow behind cart where it is desired to tow a liquid fertilizer trailer, or some like equipment, behind the cart.

Application rates can be monitored to ensure accuracy. U.S. Pat. Nos. 7,523,710 and 7,765,944 to Wilson disclose a weighing system for a grain drill type seeding implement that displays the weight of seeds in the seed hopper. The method of the Wilson invention comprises setting the application rate control at an estimated position to apply a desired rate of seed, driving the drill along the field to seed an area, checking the acreage counter to determine the area seeded, determining from the initial and final displays the weight of seed applied to area seeded, and dividing to determine the weight of seed applied to the seeded area, and thus determining the weight of seed applied per acre, which is the application rate. The actual application rate is compared to the desired rate, the rate control is adjusted accordingly, and the process is repeated until the operator is satisfied that the actual rate is satisfactorily close to the desired rate.

The Wilson system is shown on a grain drill where the amount of seed carried in the seed hopper is quite small, but such weighing systems have been adapted to the large present day air seeders described above. Generally speaking, the accuracy of the weighing system decreases as the weight of the container being weighed increases. When weighing a grain drill seed hopper full of seed with a total weight of 2,000 pounds, a ten pound difference in weight is 0.5% of the total, while weighing an air seeder product container full of seed with a total weight of 20,000 pounds, a ten pound difference in weight is 0.05% of the total. The problem of accurately determining weight is accentuated if it is desired to determine weight while the air seeder is moving along the field and bouncing forces are typically encountered.

The required accuracy also varies depending on the application rate. Where for example it is considered satisfactory if the actual rate is within 5% of the desired rate, and the application rate is 300 pounds per acre, a difference of 15 pounds per acre could be acceptable, but where the application rate is 3.0 pounds per acre, a difference of 0.15 pounds per acre would be required.

SUMMARY OF THE INVENTION

It is an object of the present invention to provide an air seeder cart apparatus that overcomes problems in the prior art.

The present invention provides an air seeder cart apparatus comprising a primary container assembly mounted on wheels for movement along the ground in an operating travel direction. The primary container assembly comprises a plurality of primary product containers, each primary product container comprising a primary fill hatch at a top thereof. An air distribution network comprises at least one product conduit, and a plurality of primary metering devices are operative to dispense agricultural products from each primary product container into the at least one product conduit. A secondary product container is mounted on a side of the primary container assembly and comprises a secondary fill hatch at a top thereof. The secondary fill hatch is located at an elevation that is lower than an elevation of the primary fill hatches. A secondary metering mechanism is operative to dispense an agricultural product from the secondary product container into the at least one product conduit.

The side mounted location provides open access for loading bagged agricultural products into the secondary product container, regardless of other equipment being towed behind the air seeder cart. A grate can be provided inside the secondary product container to carry unopened bags of agricultural product that may or may not be needed to complete a field operation.

A weighing system may be installed to determine the weight of the product in the secondary product container and the application rate. The smaller amount of weight allows for improved accuracy of the weight determination and application rate.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 7 is a schematic cut away side view of the secondary product container showing a grate inside the container;

FIG. 8 is a schematic top view of the secondary product container and grate of FIG. 7;

FIG. 9 is a schematic rear view of a truck backed into loading position adjacent to the secondary product container 17 where there is no standing platform FIG. 10 is a schematic side view of an air seeder cart apparatus of the present invention with a weighing system installed, and also showing an attached air seeder and towing tractor;

FIG. 11 is a schematic side view of a secondary metering mechanism isolated from the secondary product container by a flexible fabric spout.

DETAILED DESCRIPTION OF THE ILLUSTRATED EMBODIMENTS

Figure 1:
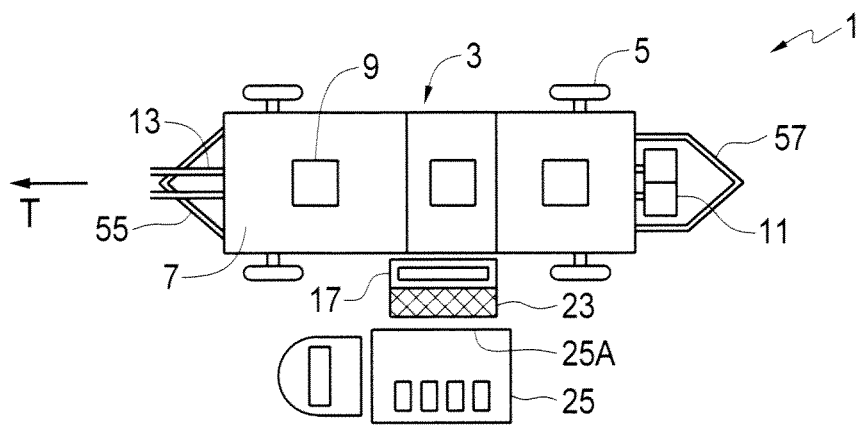
FIG. 1 is a schematic top view of an embodiment of an air seeder cart apparatus of the present invention, with the side edge of a truck bed positioned adjacent to the platform at the secondary product container.
Figure 2:
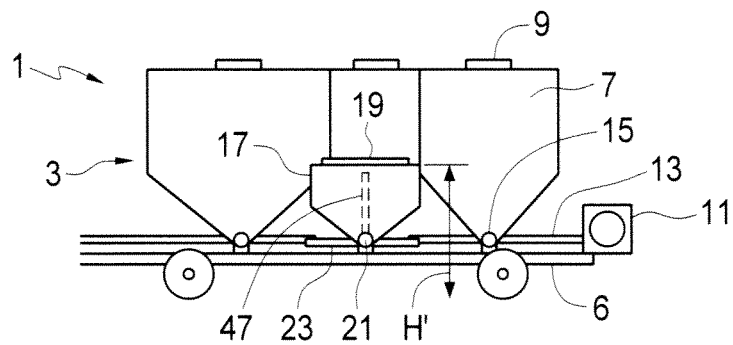
FIG. 2 is a schematic side view of the embodiment of FIG. 1.
Figure 3:
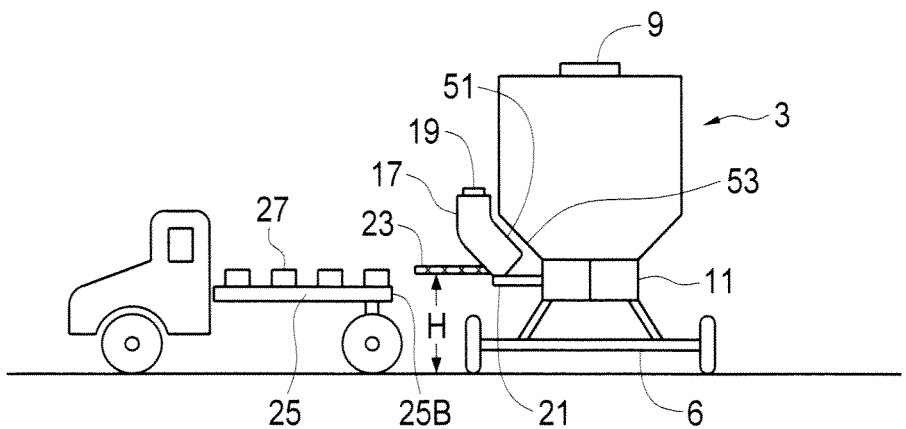
FIG. 3 is a schematic end view of the embodiment of FIG. 1, with the rear edge of a truck bed positioned adjacent to the platform at the secondary product container.

FIGS. 1-3 schematically illustrate an embodiment of an air seeder cart apparatus 1 of the present invention. The apparatus comprises a primary container assembly 3 mounted on wheels 5 for movement along the ground in an operating travel direction T. The illustrated primary container assembly 3 has three primary product containers 7 mounted on a frame 6, each primary product container 7 comprising a primary fill hatch 9 at a top thereof.

An air distribution network comprises at least one fan 11 and at least one product conduit 13. It is contemplated that most air seeders will have at least first and second fans 11, and first and second product conduits 13 as illustrated, providing two separate paths to carry product and could also have three such paths or more. Primary metering devices 15 are operative to dispense agricultural products from each primary product container 7 into one or the other of the first and second product conduits 13, which then carries the agricultural products to furrow opener on the air seeder as is known in the art. In the illustrated air seeder cart apparatus 1, the first and second product conduits 13 extend under the primary container assembly 3, and the primary metering devices 15 drop the agricultural products down into the product conduits 13.

A secondary product container 17 is mounted on a side of the primary product assembly and has a secondary fill hatch 19 at a top thereof. A secondary metering mechanism 21 is operative to dispense an agricultural product from the secondary product container 17 into one of the first and second product conduits 13.

Figure 5:
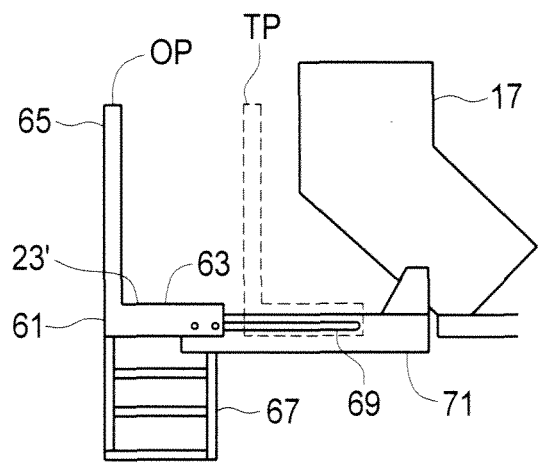
FIG. 5 is a schematic rear view of a movable standing platform that includes a ladder and a safety hand railing.

The secondary product container 17 is designed to carry agricultural products with low application rates and that are commonly transported in bags. A standing platform 23 extends outward between about three and four feet below the elevation of the secondary fill hatch 19. Typically a railing and steps up from the ground will be provided as well as illustrated in FIG. 5. These are not shown in the FIGS. 1-3 to facilitate clear illustration of the arrangement of the platform 23 and secondary product container 17. The secondary fill hatch 19 is located at an elevation that is significantly lower than an elevation of the primary fill hatches 9.

The elevation of the platform 23 relative to the secondary fill hatch 19 is selected to be comfortable for a person of average height to stand on the platform 23 and empty bags of agricultural product, such as canola seed or the like, into the secondary fill hatch 19. The elevation H of the standing platform 23 above the ground is selected to be about the same as the elevation of a truck bed 25 on which bags 27 of agricultural product will be transported to the apparatus 1, so that a person can comfortably step from the truck bed 25 to the platform 23 with only a small up or down movement. It is contemplated that the elevation H will typically be about three to four feet, and so the secondary fill hatch 19 will be located at an elevation H' that is less than eight feet above the ground.

It is thus contemplated that the secondary product container 17 will typically have a volume of less than about 60 cubic feet, or about 50 bushels. Thus about 2000 pounds of treated canola seed will be readily contained, enough to seed about 500 acres at four pounds per acre.

In the illustrated air seeder cart apparatus 1, the secondary metering mechanism 21 is operative to convey the dispensed agricultural product laterally under the primary container assembly 3 to a location above the first and second product conduits 13. The metering mechanism 21 therefore comprises both a metering device operative to dispense agricultural product from the hoppered bottom of the secondary product container 17, and some manner of conveyor operative to convey the dispensed agricultural product laterally to a point where same can be deposited into one of the product conduits 13. It is contemplated that the metering device used could simply drop the dispensed agricultural product into a conduit that slopes down to the product conduits, however this would require that the secondary product container 17 be raised from its desirable low elevation.

Figure 4:
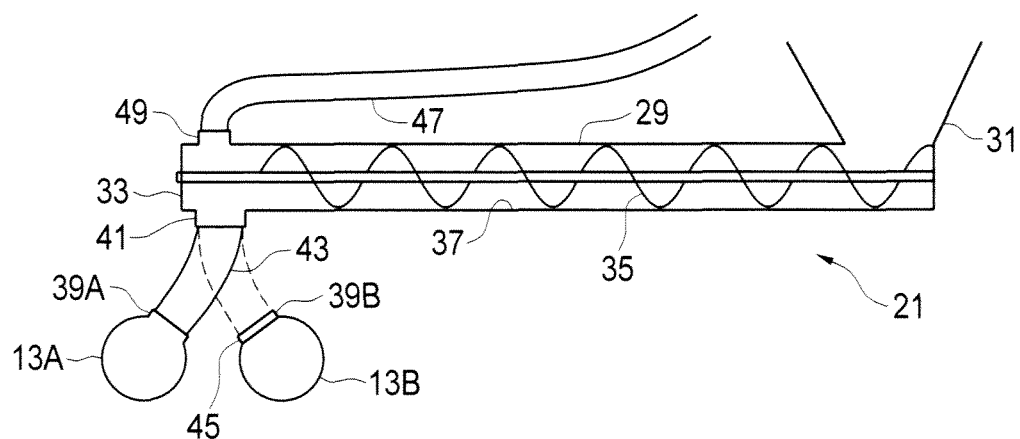
FIG. 4 is a schematic cut away front view of the metering mechanism of the embodiment of FIG. 1

Some other type of conveyor could be used however FIG. 4 schematically illustrates a metering mechanism 21 where the metering device and conveyor are both provided by an auger conveyor 29 extending laterally from a hoppered bottom 31 of the secondary product container 17 under the primary container assembly to a discharge end 33 above the first product conduit 13A and second product conduit 13B. The auger 35 of the auger conveyor 29 rotates inside a tightly fitting tube 37 at a speed selected to dispense agricultural product at the desired rate. Such auger type metering devices are known in the art.

First and second input ports 39A, 39B are defined in the corresponding first and second product conduits 13A, 13B. A discharge spout 41 at the discharge end 33 end of the auger conveyor 29 is connectable to either one of the first and second input ports 39A, 39B by a flexible hose 43, while the unconnected input port is covered with a cap 45.

In a typical air seeding operation the product conduits 13 will each carry a separate air stream with different air velocities and pressures. In order to satisfactorily meter agricultural product from the secondary product container 17 into one of the product conduits 13, it is necessary that an air duct be connected between the interior of the secondary product container 17 and the connected product conduit 13 to equalize pressures therein. Thus in the illustrated apparatus 1, an air duct 47 is connected at a first end thereof to a duct port 49 through the tube 37 of the auger conveyor 29, and is connected at a second end thereof to an upper portion of an interior of the secondary product container 17, as schematically shown in FIG. 2. Thus the air pressure in the secondary product container 17, with the secondary fill hatch 19 thereof sealed, will automatically and conveniently be equalized to the pressure present in whichever of the product conduits 13A or 13B is connected to the auger discharge spout 41.

Figure 6:
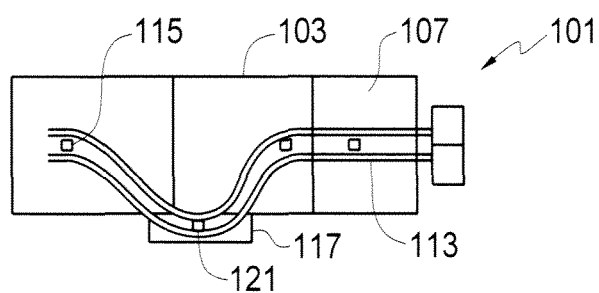
FIG. 6 is a schematic top view of an embodiment of an air seeder cart apparatus of the present invention where the product conduits curve under the secondary product container.

Alternatively FIG. 6 illustrates an embodiment of an air seeder cart apparatus 101 of the present invention where the first and second product conduits 113 extend under the secondary product container 117. The product conduits 113 are configured to pass under each of the primary metering devices 115 of the primary product containers 107 of the primary container assembly 103, and to curve outward to also pass under the secondary metering mechanism 121 of the secondary product container 117, so that the secondary metering mechanism 121 does not need to include some means for conveying dispensed agricultural products laterally under the primary container assembly 103.

In the illustrated apparatus 1 as well, in order to maximize the volume of the secondary product container 17 in the smallest area, the secondary product container 17 has an inside wall 51 that slopes downward along a corresponding sloping wall 53 of the primary container assembly 3 such that the bottom part of the secondary product container 17 is generally tucked under the sloping wall 53.

In order to minimize the transport width of the air seeder cart apparatus, FIG. 5 schematically illustrates an alternate standing platform 23' that is laterally movable from an operating position OP wherein the outer edge 61 of the standing platform 23' is removed from the secondary product container 17 and the surface 63 of the platform 23' is exposed so an operator can stand on it, to a transport position TP, shown in phantom lines, where the outer edge 61 of the standing platform 23' is adjacent to the secondary product container 17, and the surface 63 is under the sloping walls of the secondary product container 17. The standing platform 23' illustrated in FIG. 5 also includes a safety hand railing 65 and a ladder 67 facilitating access to the surface 63 of the platform 61 from the ground. The standing platform 23' slides in and out in a slot 69 defined by mounting bracket 71 attached to the secondary product container 17.

FIGS. 7 and 8 schematically illustrate a grate 73 extending across at least a portion of the interior of the secondary product container 17. The grate 73 is configured to support a number of bags 27 of agricultural product inside the secondary product container 17. In the illustrated container, the grate 73 extends across the interior of the secondary product container 17 below the fill hatch 19 and is supported by attachment to walls of the secondary product container 17. As seen in FIG. 8, the grate 73 is made of relatively narrow bars 75 that define large apertures 77 configured such that agricultural product in the interior of the secondary product container 17 above the grate 73 readily flows downward through the grate 73.

The grate 73 prevents empty bags 27 from falling to the bottom of the secondary product container 17 out of reach of the operator, and also provides a convenient location to carry full unopened bags 27 of agricultural product.

Thus the present invention also provides a method of loading bagged agricultural product from a truck bed into a product container on an air seeder cart apparatus 1. The method comprises positioning the truck bed 25 adjacent to the secondary product container 17 and opening the secondary fill hatch 19; picking up a bag 27 of agricultural product from the truck bed 25; opening the bag 27 and emptying the agricultural products from the bag 27 into the secondary fill hatch 19 of the secondary product container 17.

The orientation and elevation of the secondary fill hatch 19 can be configured such that no platform is necessary. Most often the trucks that carry the bags 27 of agricultural products will be pick-up type trucks where the height of the truck bed 25 is within a relatively small range so that instead of stepping onto a platform 23 to empty the bags 27, the operator can simply position the truck bed 25 adjacent to the secondary product container 17 as schematically illustrated in FIG. 9, and stand directly on the truck bed 25 while emptying the agricultural product from the bags 27.

Where the air seeder cart apparatus 1 comprises a standing platform 23 extending outward from the secondary product container 17 at an elevation below the elevation of the secondary fill hatch 19 as described above, after picking up the bag 27 of agricultural product from the truck bed 25, the operator will step from the truck bed 25 to the standing platform 23 prior to emptying the agricultural product from the bag 27.

Often when performing agricultural operations it is desired to place only enough of an agricultural product into the secondary product container 17 to complete a desired field operation. For example when seeding the last field of canola it is desirable to open only as many bags as required, so that the amount of canola seed left in the secondary product container 17 when the field is finished is minimized. Unopened bags may be returned to the dealer or more conveniently and safely stored compared to one or more open containers of left over canola seed.

Thus in a method of the invention the operator will empty the agricultural product from bags 27 only until a level of the agricultural product in the secondary product container 17 is at a desired level, estimated to be sufficient to complete the operation. Then one or more further unopened bags of agricultural product are placed into the secondary product container above the grate 73. The desired level may be above or below the grate 73. If above the grate, the unopened further bags 27 will be placed on the top of the agricultural product, and as the level falls the further bags will come to rest on the grate 73.

As the desired field operation progresses, the operator will monitor the amount of agricultural product remaining in the secondary product container 17 to determine if it is required to empty agricultural product from one of the further bags 27 in order to complete the operation. If a further bag is required, the operator climbs the ladder 67, stands on the platform 23, opens the secondary fill hatch 19, and empties the agricultural product from the further bag 27 into the secondary product container 17. This process may be repeated if more than one further bag 27 is carried in the secondary product container 17. Any empty further bags can be stored on the grate 73 and removed when the desired field operation is complete.

If however the further bag 27 is not required, when the desired field operation is complete the operator will climb the ladder 67, stand on the platform 23, open the secondary fill hatch 19, and remove any unopened further bags 27 from the secondary product container 17.

With the side mount location of the secondary product container 17, the truck can be driven alongside the apparatus 1 with the side edge 25A of the truck bed 25 positioned adjacent to the platform 23, or can be reversed up to the apparatus 1 such that the rear edge 25B of the truck bed 25 is positioned adjacent to the platform. Regardless of whether the implement frame carrying the furrow openers is behind or in front of the air seeder cart apparatus 1, or whether there is a fertilizer trailer or the like behind the apparatus 1, the secondary product container 17 is always openly accessible to load bags from a truck bed. The illustrated apparatus schematically illustrates in FIG. 1 that front hitch 55 or rear hitch 57 do not interfere with access to the secondary product container 17.

FIG. 10 schematically illustrates an air seeder apparatus 1 of the present invention that includes a weighing system 81 operative to determine a weight of agricultural product contained in the secondary product container 17 during operation travelling along a field surface 83. In the illustrated weighing system 81, the secondary product container 17 is mounted on the side of the frame 6 of the primary container assembly 3 through load cells 85. The entire weight of the secondary product container 17 is supported through load cells 85 on legs 87, and so the secondary metering mechanism 21 is isolated from the hoppered bottom 31 of the secondary product container 17 by a flexible fabric spout 89 or the like, as schematically illustrated in FIG. 11, so that no weight is carried by the secondary metering mechanism 21 or anything to which it in turn is attached. It is contemplated as well alternatively that the secondary metering mechanism 21 could be carried on the load cells 85, and the secondary metering mechanism 21 would then be isolated from transferring weight to any other portion of the apparatus 1.

In the illustrated apparatus, the weighing system 81 is operatively connected to a microprocessor 90 and the weight of agricultural product is displayed on a display visible to the operator of an attached air seeder 91. The microprocessor 90 is operative to determine a rate of area being seeded by the air seeder 91 and thus determine the actual application rate of agricultural product dispensed by the secondary metering mechanism 21 in pounds per acre or in such other appropriate units as may be desired.

The microprocessor 90 then can compare the actual application rate of agricultural product dispensed by the secondary metering mechanism to the desired application rate, and be connected back to the secondary metering mechanism 21 to adjust the secondary metering mechanism to change the actual application rate to correspond to the desired application rate. The product weight, and thus the application rate, may be monitored and adjusted periodically during operation while the apparatus is moving along the field. Same may also be determined when the apparatus is stationary for improved accuracy, and adjusted if required.

The combined weight of the secondary product container 17 and the agricultural product contained therein will be relatively small compared to the weight of the larger primary product containers 7 and their contents. In a typical air seeder cart the weight of the secondary product container 17 and contents might be about 3000 pounds, compared to 20-30,000 pounds in a large primary product container 7. Accuracy of the determination of the weight of product in the secondary product container 17 is thus improved compared to weight determination of a product in a primary product container 7, and thus the accuracy of the determination of the actual application rate is significantly improved as well.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An air seeder cart apparatus comprising:
    a primary container assembly mounted on wheels for movement along the ground in an operating travel direction, the primary container assembly comprising a plurality of primary product containers, each primary product container comprising a primary fill hatch at a top thereof;
    an air distribution network comprising at least one product conduit;
    a plurality of primary metering devices operative to dispense agricultural products from each primary product container into the at least one product conduit;
    a secondary product container mounted on a side of the primary container assembly and comprising a secondary fill hatch at a top thereof, wherein the secondary fill hatch is located at an elevation that is lower than an elevation of the primary fill hatches;
    a secondary metering mechanism operative to dispense an agricultural product from the secondary product container into the at least one product conduit;
    first and second product conduits extending under the primary container assembly and wherein the secondary metering mechanism is operative to convey the dispensed agricultural product laterally under the primary container assembly into one of the first and second product conduits.

2. The apparatus of claim 1 wherein the secondary metering mechanism comprises a metering device operative to dispense agricultural product from the secondary product container, and a conveyor operative to convey the dispensed agricultural product laterally.

3. The apparatus of claim 2 wherein the metering device and conveyor are provided by an auger conveyor extending laterally from a hoppered bottom of the secondary product container under the primary container assembly to a discharge end above the first and second product conduits, wherein the auger of the auger conveyor rotates at a speed selected to dispense agricultural product at a desired rate.

4. The apparatus of claim 3 comprising first and second input ports in the corresponding first and second product conduits, and wherein the discharge end of the auger conveyor is connectable to one of the first and second input ports.

5. The apparatus of claim 4 comprising an air duct connected at a first end thereof to a tube of the auger conveyor, and connected at a second end thereof to an upper portion of an interior of the secondary product container.

6. A method of loading bagged agricultural product from a truck bed into a product container on an air seeder cart, the method comprising:
    providing an air seeder cart apparatus of claim 1;

positioning the truck bed adjacent to the secondary product container and opening the secondary fill hatch;

picking up a bag of agricultural product from the truck bed;

opening the bag and emptying the agricultural product from the bag into the secondary fill hatch of the secondary product container.

7. The method of claim 6 comprising standing on the truck bed while emptying the agricultural product from the bag.

8. The method of claim 6 wherein the air seeder cart apparatus comprises a standing platform extending outward from the secondary product container at an elevation below the elevation of the secondary fill hatch, and comprising, after picking up the bag of agricultural product from the truck bed, stepping from the truck bed to the standing platform prior to emptying the agricultural product from the bag.

9. The method of claim 8 wherein the air seeder cart apparatus comprises a grate extending across at least a portion of an interior of the secondary product container, the grate configured to support at least one bag of agricultural product inside the secondary product container, and wherein the air seeder cart apparatus comprises a ladder extending downward from the standing platform.

10. The method of claim 9 comprising emptying the agricultural product from bags until a level of the agricultural product in the secondary product container is at a desired level, and placing a further bag of agricultural products into the secondary product container above the grate, and closing the secondary fill hatch.

11. The method of claim 10 comprising:

determining if it is required to empty agricultural product from the further bag in order to complete a desired field operation;

if the further bag is required, climbing the ladder, standing on the platform, opening the secondary fill hatch, and emptying the agricultural product from the further bag into the secondary product container; and if the further bag is not required, climbing the ladder, standing on the platform, opening the secondary fill hatch, and removing the further bag from the secondary product container when the desired field operation is complete.

12. The apparatus of claim 9 comprising storing the empty further bag on the grate and removing the empty further bag from the secondary product container when the desired field operation is complete.

13. The apparatus of claim 6 wherein one of a side edge and a rear edge of the truck bed is positioned adjacent to the platform.

14. An air seeder cart apparatus comprising:

a primary container assembly mounted on wheels for movement along the ground in an operating travel direction, the primary container assembly comprising a plurality of primary product containers, each primary container comprising a primary fill hatch at a top thereof;

an air distribution network comprising at least one product conduit;

a plurality of primary metering devices operative to dispense agricultural products from each primary product container into the at least one product conduit;

a secondary product container mounted on a side of the primary container assembly and comprising a secondary fill hatch at a top thereof, wherein the secondary fill hatch is located at an elevation that is lower than an elevation of the primary fill hatches;

a secondary metering mechanism operative to dispense an agricultural product from the secondary product container into the at least one product conduit;

wherein the at least one product conduit extends under the secondary product container.

15. An air seeder cart apparatus comprising:

a primary container assembly mounted on wheels for movement along the ground in an operating travel direction, the primary container assembly comprising a plurality of primary product containers, each primary product container comprising a primary fill hatch at a top thereof;

an air distribution network comprising at least one product conduit;

a plurality of primary metering devices operative to dispense agricultural products from each primary product container into the at least one product conduit;

a secondary product container mounted on a side of the primary container assembly and comprising a secondary fill hatch at a top thereof, wherein the secondary fill hatch is located at an elevation that is lower than an elevation of the primary fill hatches;

a secondary metering mechanism operative to dispense an agricultural product from the secondary product container into the at least one product conduit;

a standing platform extending outward from the secondary product container at an elevation below the elevation of the secondary fill hatch;

wherein the standing platform is laterally movable from an operating position wherein an outer edge of the standing platform is removed from the secondary product container, to a transport position wherein the outer edge of the standing platform is adjacent to the secondary product container.

16. An air seeder cart apparatus comprising:

a primary container assembly mounted on wheels for movement along the ground in an operating travel direction, the primary container assembly comprising a plurality of primary product containers, each primary product container comprising a primary fill hatch at a top thereof;

an air distribution network comprising at least one product conduit;

a plurality of primary metering devices operative to dispense agricultural products from each primary product container into the at least one product conduit;

a secondary product container mounted on a side of the primary container assembly and comprising a secondary fill hatch at a top thereof, wherein the secondary fill hatch is located at an elevation that is lower than an elevation of the primary fill hatches;

a secondary metering mechanism operative to dispense an agricultural product from the secondary product container into the at least one product conduit;

wherein the secondary product container has an inside wall sloping downward along a corresponding sloping wall of the primary container assembly.

17. An air seeder cart apparatus comprising:

a primary container assembly mounted on wheels for movement along the ground in an operating travel direction, the primary container assembly comprising a plurality of primary product containers, each primary product container comprising a primary fill hatch at a top thereof;

an air distribution network comprising at least one product conduit;

a plurality of primary metering devices operative to dispense agricultural products from each primary product container into the at least one product conduit;

a secondary product container mounted on a side of the primary container assembly and comprising a secondary fill hatch at a top thereof, wherein the secondary fill hatch is located at an elevation that is lower than an elevation of the primary fill hatches;

a secondary metering mechanism operative to dispense an agricultural product from the secondary product container into the at least one product conduit;

a grate extending across at least a portion of an interior of the secondary product container, the grate configured to support at least one bag of agricultural product inside the secondary product container.

18. The apparatus of claim 17 wherein the grate extends across the interior of the secondary product container below the fill hatch, and wherein the grate defines apertures configured such that agricultural product in the interior of the secondary product container above the grate flows downward through the grate.

19. The apparatus of claim 18 wherein the grate is supported by attachment to walls of the secondary product container, and is configured to support a plurality of bags of agricultural product.

20. An air seeder cart apparatus comprising:

a primary container assembly mounted on wheels for movement along the ground in an operating travel direction, the primary container assembly comprising a plurality of primary product containers, each primary product container comprising a primary fill hatch at a top thereof;

an air distribution network comprising at least one product conduit;

a plurality of primary metering devices operative to dispense agricultural products from each primary product container into the at least one product conduit;

a secondary product container mounted on a side of the primary container assembly and comprising a secondary fill hatch at a top thereof, wherein the secondary fill hatch is located at an elevation that is lower than an elevation of the primary fill hatches;

a secondary metering mechanism operative to dispense an agricultural product from the secondary product container into the at least one product conduit;

a weighing system operative to determine a weight of agricultural product contained in the secondary product container during operation travelling along a field surface.

21. The apparatus of claim 20 wherein the secondary product container is mounted on the side of the primary container assembly through at least one load cell.

22. The apparatus of claim 20 wherein the weight of agricultural product is displayed to an air seeder operator.

23. The apparatus of claim 20 wherein the weighing system is operatively connected to a microprocessor, the microprocessor operative to determine a rate of area seeded by an attached air seeder, and the microprocessor operative to determine an actual application rate of agricultural product dispensed by the secondary metering mechanism.

24. The apparatus of claim 23 wherein the microprocessor is further operative to compare the actual application rate of agricultural product dispensed by the secondary metering mechanism to a desired application rate, and operative to adjust the secondary metering mechanism to change the actual application rate to correspond to the desired application rate.

* * * * *